(12) United States Patent
Ma et al.

(10) Patent No.: US 9,253,593 B2
(45) Date of Patent: Feb. 2, 2016

(54) METHOD, DEVICE AND SYSTEM FOR TRANSMITTING WIRELESS DATA

(75) Inventors: Kai Ma, Shenzhen (CN); Jingqun Sun, Shenzhen (CN); Tianbo Du, Shenzhen (CN); Zhen Zhang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 57 days.

(21) Appl. No.: 14/356,466

(22) PCT Filed: Jun. 7, 2012

(86) PCT No.: PCT/CN2012/076601
§ 371 (c)(1),
(2), (4) Date: May 6, 2014

(87) PCT Pub. No.: WO2013/067811
PCT Pub. Date: May 16, 2013

(65) Prior Publication Data
US 2014/0302793 A1 Oct. 9, 2014

(30) Foreign Application Priority Data
Nov. 7, 2011 (CN) .......................... 2011 1 0348291

(51) Int. Cl.
*H04B 7/00* (2006.01)
*H04W 4/00* (2009.01)
(Continued)

(52) U.S. Cl.
CPC ............ *H04W 4/008* (2013.01); *H04W 76/025* (2013.01); *H04W 76/026* (2013.01); *H04W 28/065* (2013.01); *H04W 88/04* (2013.01); *H04W 88/06* (2013.01)

(58) Field of Classification Search
CPC ..... H04W 4/008; H04W 88/04; H04W 88/06; H04W 28/065; H04W 76/026

USPC ........ 455/41.2, 435.1, 67.14, 436, 428, 562.1
See application file for complete search history.

(56) References Cited

U.S. PATENT DOCUMENTS

| 2005/0025182 A1* | 2/2005 | Nazari | ................... H04W 88/06 370/469 |
| 2005/0070336 A1* | 3/2005 | Tamura | ............... H04M 1/6091 455/567 |

(Continued)

FOREIGN PATENT DOCUMENTS

| CN | 1717077 A | 1/2006 |
| CN | 101304384 A | 11/2008 |

(Continued)

OTHER PUBLICATIONS

International Search Report in international application No. PCT/CN2012/076601, mailed on Sep. 13, 2012. (2 pages—see entire document).

(Continued)

*Primary Examiner* — Marceau Milord
(74) *Attorney, Agent, or Firm* — Oppedahl Patent Law Firm LLC (57) ABSTRACT

A method, device and system for transmitting wireless data are disclosed. In the present disclosure, a local mobile terminal not only may exchange information with a base station, but also may exchange information with other mobile terminals by using a short distance transmission system of the mobile terminals, and transmit, by combining Local Area Network (LAN) communication and Wide Area Network (WAN) communication are combined, data simultaneously via an LAN and a WAN. A target mobile terminal may also receive and send data via the LAN and the WAN. The present disclosure can implement multi-channel transmission of wireless data, thus relieving network load greatly and improving the efficiency of data transmission.

16 Claims, 3 Drawing Sheets

(51) Int. Cl.
*H04W 76/02* (2009.01)
*H04W 88/04* (2009.01)
*H04W 88/06* (2009.01)
*H04W 28/06* (2009.01)

(56) References Cited

U.S. PATENT DOCUMENTS

| | | | |
|---|---|---|---|
| 2007/0153729 A1 | 7/2007 | Alapuranen | |
| 2010/0172291 A1* | 7/2010 | Kim | H04W 48/20 370/328 |
| 2010/0298024 A1* | 11/2010 | Choi | G06F 9/4843 455/550.1 |
| 2011/0014919 A1* | 1/2011 | Otte | H04W 36/0061 455/442 |
| 2012/0057456 A1 | 3/2012 | Bogatin | |
| 2012/0238208 A1* | 9/2012 | Bienas | H04W 8/24 455/41.2 |

FOREIGN PATENT DOCUMENTS

| | | |
|---|---|---|
| CN | 101568143 A | 10/2009 |
| CN | 101715209 A | 5/2010 |
| CN | 102404702 A | 4/2012 |
| JP | 2010093387 A | 4/2010 |
| WO | 2010059033 A2 | 5/2010 |
| WO | 2010121205 A1 | 10/2010 |

OTHER PUBLICATIONS

English Translation of the Written Opinion of the International Search Authority in international application No. PCT/CN2012/076601, mailed on Sep. 13, 2012. (11 pages—see entire document).
Supplementary European Search Report in European application No. 12847384.0, mailed on Nov. 9, 2015.

* cited by examiner

Fig.6

METHOD, DEVICE AND SYSTEM FOR TRANSMITTING WIRELESS DATA

TECHNICAL FIELD

The disclosure relates to data transmission technology in the field of mobile communication, and more particularly to a method, device and system for transmitting wireless data.

BACKGROUND

Figure 1:
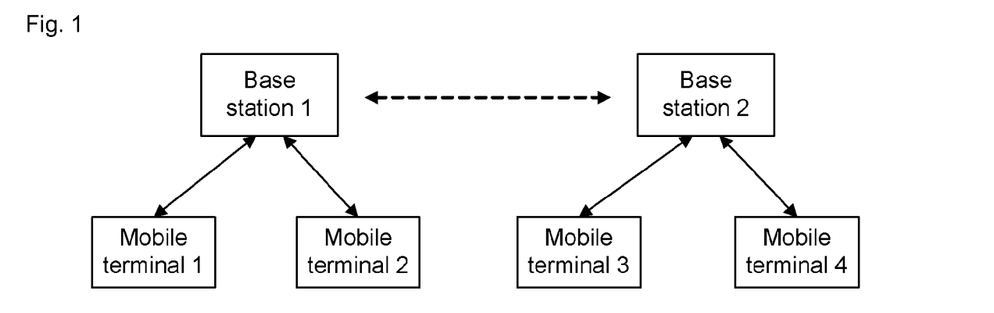
FIG. 1 is a structural diagram of an existing system for transmitting wireless data.

Currently, information interaction is performed only between mobile terminals and base stations in an existing communication system. In other words, each mobile terminal independently communicates with a base station to which the mobile terminal belongs, whereas there is no direct interactive relationship between individual mobile terminals. As shown in FIG. 1, specifically, a local mobile terminal 1 or a mobile terminal 2 sends information to a local base station 1 to which the local mobile terminal 1 or the mobile terminal 2 belongs. The base station 1 then sends the received information to a target base station to which a target mobile terminal belongs, e.g., a base station 2. The base station 2 then sends the received information to the target mobile terminal, e.g., a mobile terminal 3 or a mobile terminal 4, so as to achieve communication between the local mobile terminal and the target mobile terminal. The involved communication mode is referred to as Wide Area Network (WAN) communication. Since a local terminal communicates with a base station only through a main transmission line, the transmission rate will be very low when the local mobile terminal transmits a relatively large volume of data to the local base station, thus reducing the transmission efficiency. In addition, the local mobile terminal will fail to send data to the local base station in the case that there is a failure on a transmission line between the local mobile terminal and the local base station, thus a user cannot communicate normally.

Moreover, when a mobile terminal is to transmit a larger volume of data, network capacity can be improved only by capacity extension of a base station, so as to improve the data transmission efficiency. However, the capacity extension of the base station will cost a great deal of financial and material resources and the capacity of the base station cannot be extended unlimitedly.

In addition, all short distance transmission systems of the mobile terminal, such as a Wireless Fidelity (Wi-Fi) transmission system and a Bluetooth transmission system, can implement short distance communication between mobile terminals. The short distance communication refers to Local Area Network (LAN) communication. However, such LAN communication is isolated from WAN communication and the two communication modes cannot be applied in combination, thus a short distance transmission system of a mobile terminal in an idle state cannot often be utilized adequately and short distance communication resources of the mobile terminal are wasted.

SUMMARY

In view of this, the disclosure is intended to provide a method, device and system for transmitting wireless data, so as to be capable of adequately utilize short distance communication resources of a mobile terminals and improve the data transmission efficiency of the mobile terminal.

To this end, the technical solutions of the disclosure are implemented as follows.

A method for transmitting wireless data includes:

when a local mobile terminal needs to send data, the local mobile terminal sends to first intermediate mobile terminals adjacent to the local mobile terminal a request for inquiring states of short distance transmission systems of the first intermediate mobile terminals;

the local mobile terminal splits, according to the amount of signs of network entry certification of the first intermediate mobile terminals fed back by the first intermediate mobile terminals, the data to be sent into first data packages, wherein the signs of network entry certification of the first intermediate mobile terminals indicate the short distance transmission systems of the first intermediate mobile terminals are in an idle state;

the local mobile terminal sends part of the first data packages to the first intermediate mobile terminals whose short distance transmission systems are in an idle state according to the amount of the signs of network entry certification of the first intermediate mobile terminals, and remaining part of the first data packages to a local base station to which the local mobile terminal belongs, wherein the part of the first data packages are forwarded by the first intermediate mobile terminals to the local base station;

the local base station integrates the data packages received from the local mobile terminal and the first intermediate mobile terminals belonging to the same data, and sends the integrated data to a target base station to which a target mobile terminal belongs;

the target base station receives the integrated data, and sends to second intermediate mobile terminals adjacent to the target mobile terminal a request for inquiring states of short distance transmission systems of the second intermediate mobile terminals;

the target base station splits, according to the amount of signs of network entry certification of the second intermediate mobile terminals fed back by the second intermediate mobile terminals, the integrated data into second data packages, wherein the signs of network entry certification of the second intermediate mobile terminals indicate the short distance transmission systems of the second intermediate mobile terminals are in an idle state;

the target base station sends part of the second data packages to the second intermediate mobile terminals whose short distance transmission systems are in an idle state according to the amount of the signs of network entry certification of the second intermediate mobile terminals, and remaining part of the second data packages to a target mobile terminal, wherein the part of the second data packages are forwarded by the second intermediate mobile terminals to the target mobile terminal; and the target mobile terminal integrates the data packages received from the target base station and the second intermediate mobile terminals belonging to the same data, so as to obtain the data from the local mobile terminal.

Before the data to be sent are split into the first data packages, the method may further include: a size of each data package is determined according to the signs of network entry certification of the first intermediate mobile terminals; accordingly, the splitting the data to be sent into first data packages may include: splitting the data to be sent into the first data packages according to the determined size of each data package.

The process that a size of each data package is determined according to the signs of network entry certification of the first intermediate mobile terminals may include: the size of each data package is determined, according to the size of the data to be sent, the amount of the signs of network entry certification of the first intermediate mobile terminals whose short distance transmission systems are in an idle state and a transmission rate of a transmission mode applied by a short distance transmission system corresponding to a sign of network entry certification of a first intermediate mobile.

After the data to be sent are split into the first data packages, the method may further include: the first data packages are numbered, so as to make each data package have its own serial number.

After the part of the first data packages are forwarded by the first intermediate mobile terminals to the local base station, the method may further include: each first relay mobile terminal sends a feedback message to the local mobile terminal respectively, wherein each feedback message includes a serial number of a data package received by a first intermediate mobile terminal from the local mobile terminal; the local mobile terminal determines, according to the received feedback message, whether a failure occurs in the transmission of a data package; when a failure occurs in the transmission of a data package, the local mobile terminal sends to the first intermediate mobile terminals adjacent to the local mobile terminal the request for inquiring the states of the short distance transmission systems of the first intermediate mobile terminals; and the local mobile terminal sends the data package to which a failure of the transmission occurs to a first intermediate mobile terminal whose short distance transmission system is in an idle state.

The process that the data to be sent are split into first data packages according to the amount of signs of network entry certification of the first intermediate mobile terminals fed back by the first intermediate mobile terminals may include: a part of the short distance transmission systems which are in an idle state are taken as main short distance transmission systems according to the amount of signs of network entry certification of the first intermediate mobile terminals fed back by the first intermediate mobile terminals, and other part of the short distance transmission systems which are in an idle state are taken as secondary short distance transmission systems; and the data to be sent are split into the first of data packages according to the amount of the main short distance transmission systems.

After the part of the first data packages are forwarded by the first intermediate mobile terminals to the local base station, the method may further include: each first relay mobile terminal sends a feedback message to the local mobile terminal, wherein each feedback message includes a serial number of a data package received by a first intermediate mobile terminal from the local mobile terminal; and the local mobile terminal determines, according to the feedback message, whether a failure occurs in the transmission of a data package; when a failure occurs in the transmission of a data package, the local mobile terminal sends the data package to which a failure of the transmission occurs to a secondary short distance transmission system.

A mobile terminal includes a first state query information sending unit, a first data package splitting unit and a first data package sending unit, wherein the first state query information sending unit is configured to, when needing to send data, send, to first intermediate mobile terminals adjacent to the mobile terminal to which the first state query information sending unit belongs, a request for inquiring states of short distance transmission systems of the first intermediate mobile terminals;

the first data package splitting unit is configured to split, according to the amount of signs of network entry certification of the first intermediate mobile terminals fed back by the first intermediate mobile terminals, the data to be sent into first data packages, wherein the signs of network entry certification of the first intermediate mobile terminals indicate the short distance transmission systems of the first intermediate mobile terminals are in an idle state; and the first data package sending unit is configured to send part of the first data packages to the first intermediate mobile terminals whose short distance transmission systems are in an idle state, and send remaining part of the first data packages to a local base station to which the local mobile terminal belongs, wherein the part of the first data packages are forwarded by the first intermediate mobile terminals to the local base station.

The mobile terminal may further include: a data package size determination unit configured to determine a size of each data package according to the signs of network entry certification of the first intermediate mobile terminals;

wherein the first data package splitting unit may be further configured to split the data to be sent into the first data packages according to the determined size of each data package.

The data package size determination unit may be specifically configured to determine the size of each data package according to the size of the data to be sent, the amount of the signs of network entry certification of the first intermediate mobile terminals whose short distance transmission systems are in an idle state and a transmission rate of a transmission mode applied by a short distance transmission system corresponding to a sign of network entry certification of a first intermediate mobile.

The mobile terminal may further include: a data package numbering unit configured to number the split first data packages, so as to make each data package have its own serial number.

The mobile terminal may further include: a transmission failure determination unit configured to determine, according to the feedback message, whether a failure occurs in the transmission of a data package;

wherein the first state query information sending unit may be further configured to, when a failure occurs in the transmission of a data package, send, to the first intermediate mobile terminals adjacent to the local mobile terminal to which the first state query information sending unit belongs, the request for inquiring the states of the short distance transmission systems of the first intermediate mobile terminals; and wherein the first data package sending unit may be further configured to send the data package to which a failure of the transmission occurs to a first intermediate mobile terminal whose short distance transmission system is in an idle state.

The first data package splitting unit may be further configured to: take a part of the short distance transmission systems which are in an idle state as main short distance transmission systems according to the amount of signs of network entry certification of the first intermediate mobile terminals fed back by the first intermediate mobile terminals, and take other part of the short distance transmission systems which are in an idle state as secondary short distance transmission systems; and split, according to the amount of the main short distance transmission systems, the data to be sent into the first data packages.

The first data package sending unit may be further configured to send the data package to which a failure of the transmission occurs to a secondary short distance transmission system.

A mobile terminal includes: a sign of network entry certification feedback unit and a data package forwarding unit, wherein the sign of network entry certification feedback unit is configured to feed back network access identification information according to a received request for inquiring states of short distance transmission systems; and the data package forwarding unit is configured to send a received data package to a local base station or a target mobile terminal.

A mobile terminal includes: a data package receiving unit and a data package integrating unit, wherein the data package receiving unit is configured to receive a data package; and the data package integrating unit is configured to integrate the received data packages belonging to the same data to obtain the complete message.

A base station includes: a data package integrating unit and an integrated data sending unit, wherein the data package integrating unit is configured to integrate received data packages belonging to the same data; and the integrated data sending unit is configured to send the integrated data to a target base station to which a target mobile terminal belongs.

A base station includes: a data receiving unit, a second state query information sending unit, a second data package splitting unit and a second data package sending unit, wherein the data receiving unit is configured to receive integrated data sent from another base station;

the second state query information sending unit is configured to, when needing to send the integrated data, send, to intermediate mobile terminals adjacent to a base station to which the second state query information sending unit belongs, a request for inquiring states of short distance transmission systems of the first intermediate mobile terminals;

the second data package splitting unit is configured to split, according to the amount of signs of network entry certification of the intermediate mobile terminals fed back by the intermediate mobile terminals, the integrated data to be sent into first data packages, wherein the signs of network entry certification of the intermediate mobile terminals indicate the short distance transmission systems of the intermediate mobile terminals are in an idle state; and the second data package sending unit is configured to send part of the data packages to the intermediate mobile terminals whose short distance transmission systems are in an idle state, and send remaining part of the data packages to a local base station to which the local mobile terminal belongs, wherein the part of the data packages are forwarded by the intermediate mobile terminals to the local base station.

A system for transmitting wireless data includes: a local mobile terminal, multiple relay mobile terminals, a local base station, a target base station and a target mobile terminal, wherein the local mobile terminal is configured to: when the local mobile terminal needs to send data, send to first intermediate mobile terminals adjacent to the local mobile terminal a request for inquiring states of short distance transmission systems of the first intermediate mobile terminals, and split, according to the amount of signs of network entry certification of the first intermediate mobile terminals fed back by the first intermediate mobile terminals, the data to be sent into first data packages, wherein the signs of network entry certification of the first intermediate mobile terminals indicate the short distance transmission systems of the first intermediate mobile terminals are in an idle state; and send part of the first data packages to the first intermediate mobile terminals whose short distance transmission systems are in an idle state according to the amount of the signs of network entry certification of the first intermediate mobile terminals, and send remaining part of the first data packages to a local base station to which the local mobile terminal belongs, wherein the part of the first data packages are forwarded by the first intermediate mobile terminals to the local base station;

the relay mobile terminal is configured to: feed back, according to the request for inquiring states of short distance transmission systems of the first intermediate mobile terminals send from the local mobile terminal or the target base station, the sign of network entry certification to the local mobile terminal or the target base station; and send the received data package to the local base station or the target mobile terminal;

the local base station is configured to integrate the data packages received from the local mobile terminal and the first intermediate mobile terminals belonging to the same data, and send the integrated data to the target base station to which the target mobile terminal belongs;

the target base station is configured to: receive the integrated data from the local base station, send to second intermediate mobile terminals adjacent to the target mobile terminal a request for inquiring states of short distance transmission systems of the second intermediate mobile terminals, and split, according to the amount of signs of network entry certification of the second intermediate mobile terminals fed back by the second intermediate mobile terminals, the integrated data into second data packages, wherein the signs of network entry certification of the second intermediate mobile terminals indicate the short distance transmission systems of the second intermediate mobile terminals are in an idle state; and send part of the second data packages to the second intermediate mobile terminals whose short distance transmission systems are in an idle state according to the amount of the signs of network entry certification of the second intermediate mobile terminals, and send remaining part of the second data packages to a target mobile terminal, wherein the part of the second data packages are forwarded by the second intermediate mobile terminals to the target mobile terminal; and the target mobile terminal is configured to integrate the data packages received from the target base station and the second intermediate mobile terminals belonging to the same data, so as to obtain the data sent from the local mobile terminal.

From the foregoing, it can be seen that a local mobile terminal in the disclosure not only may exchange information with a base station, but also may exchange information with other mobile terminals by using a short distance transmission system of the mobile terminals, and transmit, by combining Local Area Network (LAN) communication and Wide Area Network (WAN) communication are combined, data simultaneously via an LAN and a WAN. A target mobile terminal may also receive and send data via the LAN and the WAN. The present disclosure can implement multi-channel transmission of wireless data, thus relieving network load greatly and improving the efficiency of data transmission.

DETAILED DESCRIPTION

Figure 2:
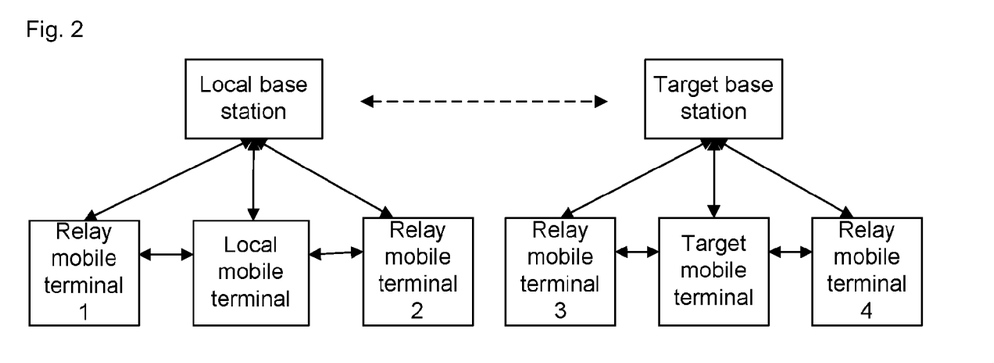
FIG. 2 is a structural diagram of a system for transmitting wireless data according to the disclosure.

The disclosure discloses a system for transmitting wireless data. As shown in FIG. 2, the system includes: a local mobile terminal, relay mobile terminals, a target mobile terminal, a local base station and a target base station, wherein the local mobile terminal is configured to: when the local mobile terminal needs to send data, send to first intermediate mobile terminals adjacent to the local mobile terminal a request for inquiring states of short distance transmission systems of the first intermediate mobile terminals, and split, according to the amount of signs of network entry certification of the first intermediate mobile terminals fed back by the first intermediate mobile terminals, the data to be sent into first data packages, wherein the signs of network entry certification of the first intermediate mobile terminals indicate the short distance transmission systems of the first intermediate mobile terminals are in an idle state; and send part of the first data packages to the first intermediate mobile terminals whose short distance transmission systems are in an idle state according to the amount of the signs of network entry certification of the first intermediate mobile terminals, and send remaining part of the first data packages to a local base station to which the local mobile terminal belongs, wherein the part of the first data packages are forwarded by the first intermediate mobile terminals to the local base station;

the relay mobile terminal is configured to: feed back, according to the request for inquiring states of short distance transmission systems of the first intermediate mobile terminals send from the local mobile terminal or the target base station, the sign of network entry certification to the local mobile terminal or the target base station; and send the received data package to the local base station or the target mobile terminal;

the local base station is configured to integrate the data packages received from the local mobile terminal and the first intermediate mobile terminals belonging to the same data, and send the integrated data to the target base station to which the target mobile terminal belongs;

the target base station is configured to: receive the integrated data from the local base station, send to second intermediate mobile terminals adjacent to the target mobile terminal a request for inquiring states of short distance transmission systems of the second intermediate mobile terminals, and split, according to the amount of signs of network entry certification of the second intermediate mobile terminals fed back by the second intermediate mobile terminals, the integrated data into second data packages, wherein the signs of network entry certification of the second intermediate mobile terminals indicate the short distance transmission systems of the second intermediate mobile terminals are in an idle state; and send part of the second data packages to the second intermediate mobile terminals whose short distance transmission systems are in an idle state according to the amount of the signs of network entry certification of the second intermediate mobile terminals, and send remaining part of the second data packages to a target mobile terminal, wherein the part of the second data packages are forwarded by the second intermediate mobile terminals to the target mobile terminal; and the target mobile terminal is configured to integrate the data packages received from the target base station and the second intermediate mobile terminals belonging to the same data, so as to obtain the data sent from the local mobile terminal.

Figure 3:
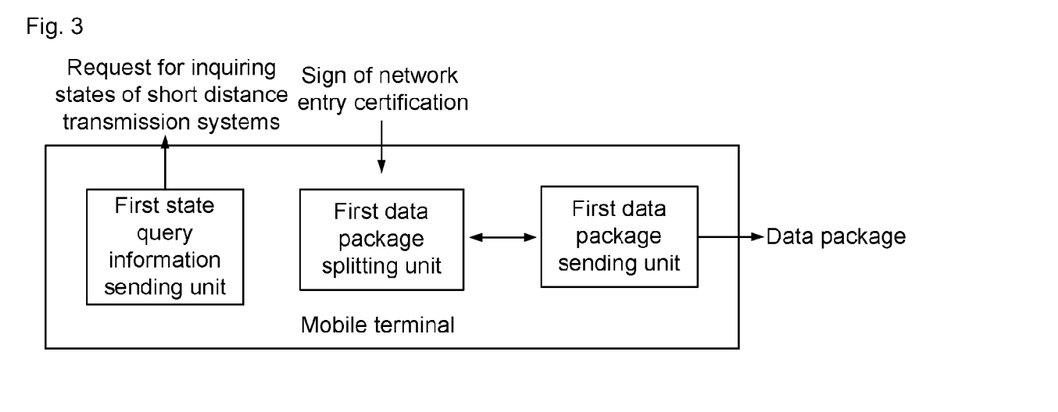
FIG. 3 is a structural diagram of a first embodiment of a mobile terminal of the disclosure.

The disclosure discloses a mobile terminal. As shown in FIG. 3, the mobile terminal is a local mobile terminal that sends information. The mobile terminal includes: a first state query information sending unit, a first data package splitting unit and a first data package sending unit, wherein the first state query information sending unit is configured to, when needing to send data, send, to first intermediate mobile terminals adjacent to the mobile terminal to which the first state query information sending unit belongs, a request for inquiring states of short distance transmission systems of the first intermediate mobile terminals;

the first data package splitting unit is configured to split, according to the amount of signs of network entry certification of the first intermediate mobile terminals fed back by the first intermediate mobile terminals, the data to be sent into first data packages, wherein the signs of network entry certification of the first intermediate mobile terminals indicate the short distance transmission systems of the first intermediate mobile terminals are in an idle state; and the first data package sending unit is configured to send part of the first data packages to the first intermediate mobile terminals whose short distance transmission systems are in an idle state, and send remaining part of the first data packages to a local base station to which the local mobile terminal belongs, wherein the part of the first data packages are forwarded by the first intermediate mobile terminals to the local base station.

Optionally, as shown in FIG. 3, the mobile terminal further includes: a data package size determination unit configured to determine a size of each data package according to the signs of network entry certification of the first intermediate mobile terminals;

wherein the first data package splitting unit is further configured to split the data to be sent into the first data packages according to the determined size of each data package.

Optionally, the data package size determination unit is specifically configured to determine the size of each data package according to the size of the data to be sent, the amount of the signs of network entry certification of the first intermediate mobile terminals whose short distance transmission systems are in an idle state and a transmission rate of a transmission mode applied by a short distance transmission system corresponding to a sign of network entry certification of a first intermediate mobile.

Figure 4:
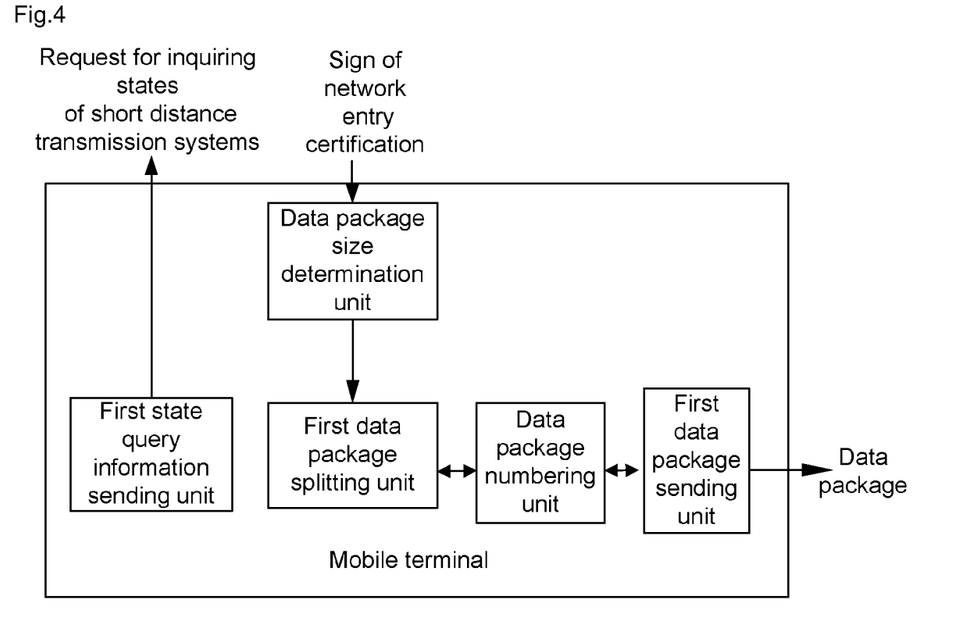
FIG. 4 is a structural diagram of a second embodiment of the mobile terminal of the disclosure.

Optionally, as shown in FIG. 4, the mobile terminal further includes: a data package numbering unit configured to number the split first data packages, so as to make each data package have its own serial number.

Optionally, the mobile terminal further includes: a transmission failure determination unit configured to determine, according to the received feedback message, whether a failure occurs in the transmission of a data package;

the first state query information sending unit is further configured to, when a failure occurs in the transmission of a data package, send, to the first intermediate mobile terminals adjacent to the local mobile terminal to which the first state query information sending unit belongs, the request for inquiring the states of the short distance transmission systems of the first intermediate mobile terminals; and the first data package sending unit is further configured to send the data package to which a failure of the transmission occurs to a first intermediate mobile terminal whose short distance transmission system is in an idle state.

Optionally, the first data package splitting unit is further configured to: take a part of the short distance transmission systems which are in an idle state as main short distance transmission systems according to the amount of signs of network entry certification of the first intermediate mobile terminals fed back by the first intermediate mobile terminals, and take other part of the short distance transmission systems which are in an idle state as secondary short distance transmission systems; and split, according to the amount of the main short distance transmission systems, the data to be sent into the first data packages.

Optionally, the first data package sending unit is further configured to send the data package to which a failure of the transmission occurs to a secondary short distance transmission system.

The disclosure further discloses a mobile terminal. The mobile terminal is a relay mobile terminal that forwards a received data package. The mobile terminal includes: a sign of network entry certification feedback unit and a data package forwarding unit, wherein the sign of network entry certification feedback unit is configured to feed back a sign of network entry certification according to a received request for inquiring states of short distance transmission systems; and the data package forwarding unit is configured to send a received data package to a local base station or a target mobile terminal.

The disclosure further discloses a mobile terminal. The mobile terminal is a target mobile terminal that receives information transmitted from a local mobile terminal. The mobile terminal includes: a data package receiving unit and a data package integrating unit, wherein the data package receiving unit is configured to receive a data package; and the data package integrating unit is configured to integrate the received data packages belonging to the same data to obtain the complete message.

The aforementioned mobile terminals include a short distance transmission system. The short distance transmission system may be a Bluetooth transmission system or a Wi-Fi transmission system, and is, of course, not limited to the two systems. The mobile terminal may be provided with the Bluetooth transmission system or the Wi-Fi transmission system, or may be also provided with the Bluetooth transmission system and the Wi-Fi transmission system simultaneously. Each short distance transmission system corresponds to a sign of network entry certification, namely, if the mobile terminal is provided with the Bluetooth transmission system and the Wi-Fi transmission system simultaneously, then the mobile terminal has two signs of network entry certification. Accordingly, the mobile terminal feeds back two signs of network entry certification.

The short distance transmission system includes a radio frequency transceiver module, a radio frequency amplification module, a filtering module, a matching module and the like. The four modules may be independent with each other, or may be also integrated together. A processing chip and a circuit of each short distance transmission systems may be independent, or may be also integrated together.

The short distance transmission system is connected with a short distance transmission antenna. The short distance transmission antenna is responsible for information transmission between a mobile terminal and another mobile terminal through time-division or frequency-division communication, namely, the short distance transmission antenna may communicate with a single mobile terminal, or may also communicate with a plurality of mobile terminals simultaneously.

Each short distance transmission antenna may exist independently, or may be also combined randomly and integrated together with other short distance transmission antennae. An integrated antenna may be a multi-polarized antenna, a multi-frequency antenna or a multi-polarized multi-frequency antenna.

The disclosure discloses a base station. The base station is a base station to which a local mobile terminal belongs. The base station includes: a data package integrating unit and an integrated data sending unit, wherein the data package integrating unit is configured to integrate received data packages belonging to the same data; and the integrated data sending unit is configured to send the integrated data to a target base station to which a target mobile terminal belongs.

Figure 5:
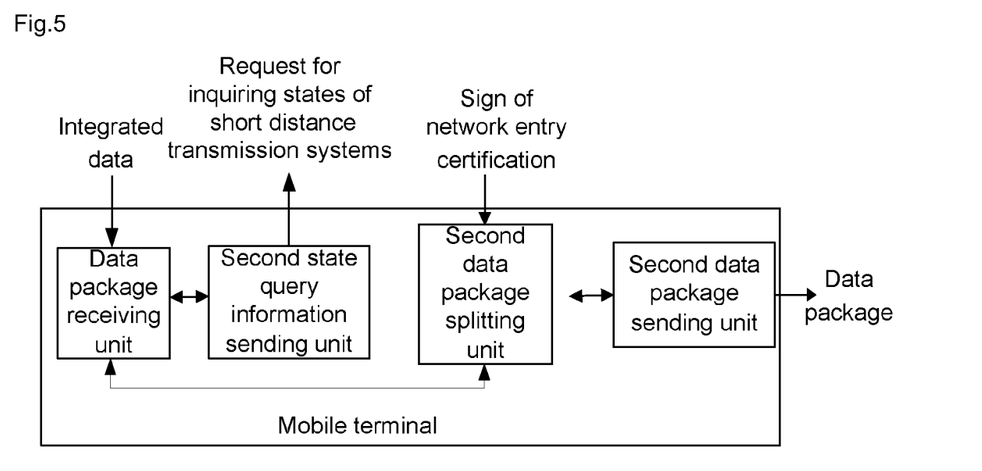
FIG. 5 is a structural diagram of a base station of the disclosure.

The disclosure further discloses a base station. As shown in FIG. 5, the base station is a base station to which a target mobile terminal belongs. The base station includes: a data receiving unit, a second state query information sending unit, a second data package splitting unit and a second data package sending unit, wherein the data receiving unit is configured to receive integrated data sent from another base station;

the second state query information sending unit is configured to, when needing to send the integrated data, send, to intermediate mobile terminals adjacent to a base station to which the second state query information sending unit belongs, a request for inquiring states of short distance transmission systems of the first intermediate mobile terminals;

the second data package splitting unit is configured to split, according to the amount of signs of network entry certification of the intermediate mobile terminals fed back by the intermediate mobile terminals, the integrated data to be sent into first data packages, wherein the signs of network entry certification of the intermediate mobile terminals indicate the short distance transmission systems of the intermediate mobile terminals are in an idle state; and the second data package sending unit is configured to send part of the data packages to the intermediate mobile terminals whose short distance transmission systems are in an idle state, and send remaining part of the data packages to a local base station to which the local mobile terminal belongs, wherein the part of the data packages are forwarded by the intermediate mobile terminals to the local base station.

Figure 6:
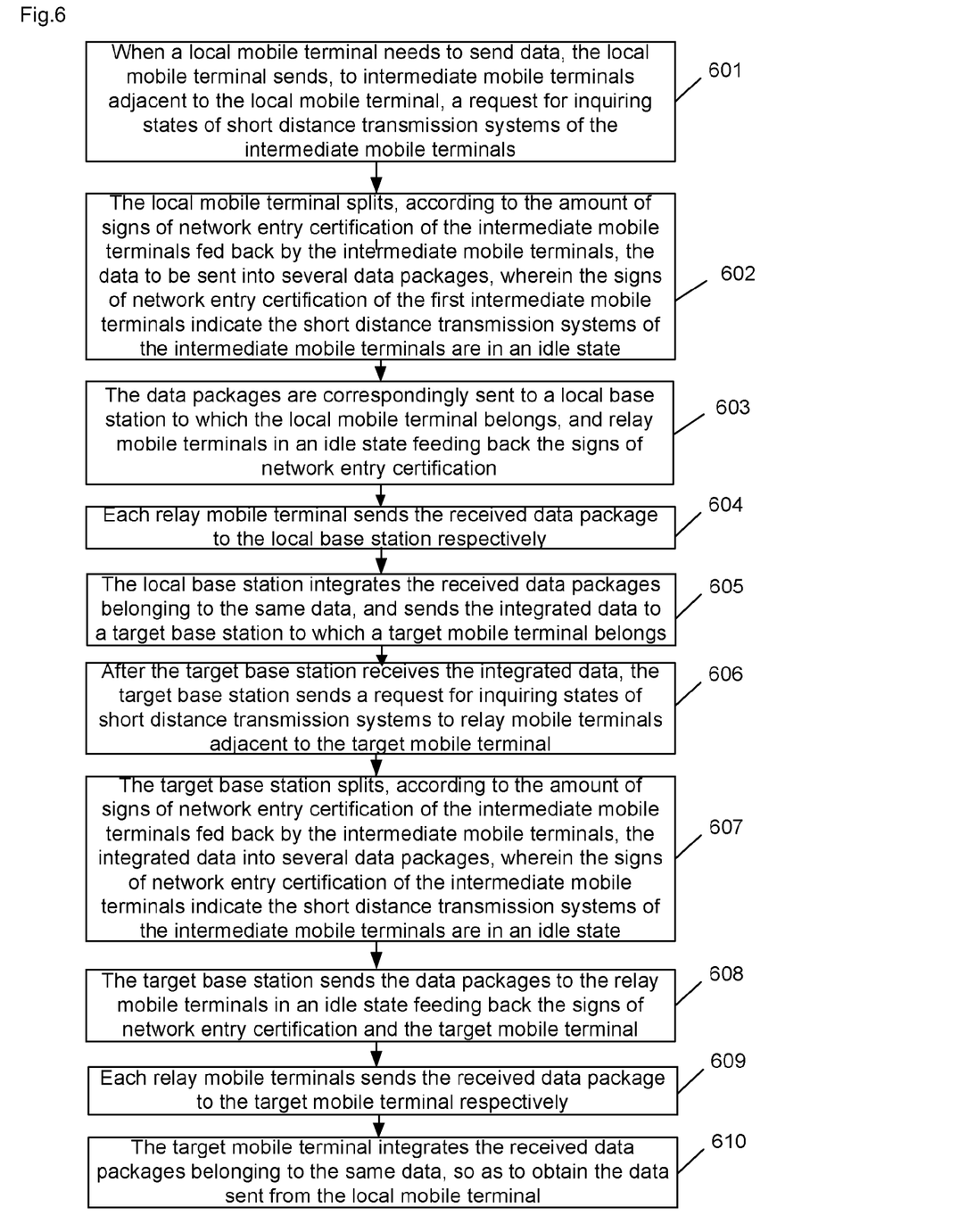
FIG. 6 is a flowchart illustrating implementation of a first embodiment of a method for transmitting wireless data according to the disclosure.

Base on the above device and system, the disclosure discloses a method for transmitting wireless data. As shown in FIG. 6, a first embodiment of the method for transmitting wireless data of the disclosure includes the following steps:

Step 601: When a local mobile terminal needs to send data, the local mobile terminal sends, to intermediate mobile terminals adjacent to the local mobile terminal, a request for inquiring states of short distance transmission systems of the intermediate mobile terminals.

Step 602: The local mobile terminal splits, according to the amount of signs of network entry certification of the intermediate mobile terminals fed back by the intermediate mobile terminals, the data to be sent into several data packages, wherein the signs of network entry certification of the first intermediate mobile terminals indicate the short distance transmission systems of the intermediate mobile terminals are in an idle state.

Wherein, the sign of network entry certification is configured to identify the state of the short distance transmission system of the mobile terminal. The state of the short distance transmission system includes an idle state and a busy state.

Optionally, before the data to be sent are split into data packages, the method further includes: the size of each data package is determined according to the signs of network entry certification;

accordingly, the splitting the data to be sent into data packages includes: the data to be sent are split into several data packages according to the determined size of each data package.

Optionally, the determining the size of each data package according to the signs of network entry certification includes: the size of each data package is determined according to the size of the data to be sent, the amount of the signs of network entry certification of the intermediate mobile terminals whose short distance transmission systems are in an idle state, and a transmission rate of a transmission mode applied by a short distance transmission system corresponding to a sign of network entry certification of an intermediate mobile.

Optionally, after the data to be sent are split into several data packages, the method further includes: the data packages are numbered, so as to make each data package have its own serial number.

Step 603: The data packages are correspondingly sent to a local base station to which the local mobile terminal belongs, and relay mobile terminals in an idle state feeding back the signs of network entry certification.

Step 604: Each relay mobile terminal sends the received data package to the local base station respectively.

Optionally, after each relay mobile terminal sends the received data package to the local base station respectively, the method further includes:

each relay mobile terminal sends a feedback message to the local mobile terminal respectively, wherein each feedback message includes a serial number of a data package received by an intermediate mobile terminal from the local mobile terminal; the local mobile terminal determines, according to the received feedback messages, whether a failure occurs in the transmission of a data package; when a failure occurs in the transmission of a data package, the local mobile terminal sends, to the intermediate mobile terminals adjacent to the local mobile terminal, the request for inquiring the states of the short distance transmission systems of the intermediate mobile terminals; and the local mobile terminal sends the data package to which a failure of the transmission occurs to an intermediate mobile terminal whose short distance transmission system is in an idle state.

Step 605: The local base station integrates the received data packages belonging to the same data, and sends the integrated data to a target base station to which a target mobile terminal belongs.

Step 606: After the target base station receives the integrated data, the target base station sends a request for inquiring states of short distance transmission systems to relay mobile terminals adjacent to the target mobile terminal.

Step 607: The target base station splits, according to the amount of signs of network entry certification of the intermediate mobile terminals fed back by the intermediate mobile terminals, the integrated data into several data packages, wherein the signs of network entry certification of the intermediate mobile terminals indicate the short distance transmission systems of the intermediate mobile terminals are in an idle state.

Step 608: The target base station sends the data packages to the relay mobile terminals in an idle state feeding back the signs of network entry certification and the target mobile terminal.

Step 609: Each relay mobile terminals sends the received data package to the target mobile terminal respectively.

Step 610: The target mobile terminal integrates the received data packages belonging to the same data, so as to obtain the data sent from the local mobile terminal.

Base on the above device and system, the disclosure further discloses an embodiment of another method for transmitting wireless data. In the present embodiment, a local mobile terminal takes a part of short distance transmission systems in an idle state as available short distance transmission systems according to received signs of network entry certification, and takes the rest of the short distance transmission systems in an idle state as backup short distance transmission systems.

A second embodiment of the method for transmitting wireless data of the disclosure includes the following steps:

Step 701: When a local mobile terminal needs to send data, the local mobile terminal sends a request for inquiring a state of a short distance transmission system to each relay mobile terminal.

Step 702: Each relay mobile terminals that has received the request send a sign of network entry certification to the local mobile terminal respectively.

Step 703: The local mobile terminal takes a part of short distance transmission systems in an idle state as available short distance transmission systems according to the received signs of network entry certification, and takes the rest of the short distance transmission systems in the idle state as backup short distance transmission systems. If the states of the short distance transmission systems identified by all signs of network entry certification are busy, then the local mobile terminal sends, according to an existing transmission mode, data to a base station to which the local mobile terminal belongs.

For example, if there are 30 signs of network entry certification identifying the short distance transmission system in an idle state in the received signs of network entry certification, then 20 short distance transmission systems in an idle state are taken as available short distance transmission systems and the other 10 short distance transmission systems in an idle state are taken as backup short distance transmission systems.

Step 704: The local mobile terminal splits, according to the amount of the available short distance transmission systems, the data to be sent into multiple data packages the amount of which is the same as the amount of the available short distance transmission systems, and the local mobile terminal numbers the data packages to make each data package have its own serial number.

If it is assumed that there are 20 available short distance transmission systems and one base station, then the data to be sent are split into 21 data packages in total, and the split data packages correspond to serial numbers 1 to 21 successively.

Optionally, the size of each split data package is determined according to the signs of network entry certification. Specifically, the size of each data package is determined according to the size of the data to be sent, the amount of the signs of network entry certification of the intermediate mobile terminals whose short distance transmission systems are in an idle state, and a transmission rate of a transmission mode applied by a short distance transmission system corresponding to a sign of network entry certification of an intermediate mobile.

For example, the theoretic maximum transmission rate of an Enhance Data Rate for Global System for Mobile Communications (GSM) Evolution (EDGE) transmission mode is 384 kbps, the theoretic maximum transmission rate of a Bluetooth Institute of Electrical and Electronics Engineers (IEEE) 802.15 transmission mode is 1 Mbps, and the theoretic maximum transmission rate of a Wi-Fi 802.11g protocol transmission mode is 54 Mbps. It can be learned from the content of the signs of network entry certification that: there are 10 Bluetooth transmission systems in the available short distance transmission systems and there are 10 Wi-Fi transmission systems in the available short distance transmission systems. If the size of the data to be sent is M and the local mobile terminal is a mobile terminal supporting EDGE technology of a GSM system, then the size of data packages numbered 1 to 10, which are transmitted to the Bluetooth transmission systems, is $M*1/(54*10+1*10+0.384)$. Similarly, the size of data packages numbered 11 to 20, which are transmitted to the Wi-Fi transmission systems, is $M*54/(54*10+1*10+0.384)$, and the size of the data package numbered 21, which is transmitted to a base station, is $M*0.384/(54*10+1*10+0.384)$.

Step 705: The local mobile terminal sends the numbered data packages to the local base station and the respective available short distance transmission systems correspondingly, and sends a split message to a base station.

Wherein, the split message includes a split coding mode for splitting the data packages, the number of the data packages, the size of the data packages and the serial number corresponding to each data package; and the local mobile terminal supports a Multiple-Input and Multiple-Output (MIMO) transmission mode.

For example, the data packages numbered 1 to 10 are respectively sent to the Bluetooth transmission systems in the available short distance transmission systems, the data packages numbered 11 to 20 are respectively sent to the Wi-Fi transmission systems in the available short distance transmission systems, and the data package numbered 21 is sent to the base station.

Step 706: Each available short distance transmission system sends the received data packages to the local base station, and sends a feedback message to the local mobile terminal. The feedback message includes the serial number of the data package and the size of the data package.

Step 707: The local mobile terminal determines, according to the received feedback messages, whether a failure occurs in the transmission of a data package. If a failure occurs in the transmission of a data package, Step 717 is executed. If no failure occurs in the transmission of a data package, Step 708 is executed.

Specifically, the local mobile terminal determines, according to the feedback messages received in a preset period of time (5 seconds after the local mobile terminal sends the data packages to the available short distance transmission systems), whether a failure occurs in the transmission of a data package. For example, if the local mobile terminal receives 21 pieces of feedback messages in total within 5 seconds after the local mobile terminal sends the data packages to the available short distance transmission systems, then it is determined that there is no data package transmission failure. If the local mobile terminal receives 20 pieces of feedback messages in total within 5 seconds, then it is determined that a failure occurs in the transmission of a data package.

If the number of the feedback messages received by the local mobile terminal within 5 seconds after the local mobile terminal sends data packages transmitted unsuccessfully to the available short distance transmission systems is consistent with the number of the data packages which are transmitted unsuccessfully, then it is determined that there is no data package transmission failure. If the number of the feedback messages received by the local mobile terminal within 5 seconds is not consistent with the number of the data packages which are transmitted unsuccessfully, then it is determined that there is a data transmission failure.

Step 708: The local base station integrates data packages belonging to the same data, and sends the integrated data to a target base station to which a target mobile terminal belongs.

Specifically, the local base station performs, according to the split coding mode for splitting the data package in the split message, data decoding and combining to recover data, and transmits, via a communication network, the integrated data to the target base station to which the target mobile terminal belongs.

Step 709: After the target base station receives the integrated data, the target base station sends a request for inquiring states of short distance transmission systems to all relay mobile terminals adjacent to the target mobile terminal.

Step 710: Each relay mobile terminal that has received the request sends a sign of network entry certification to the target base station respectively.

Step 711: The target base station takes a part of short distance transmission systems in an idle state as available short distance transmission systems according to the received signs of network entry certification, and takes the rest of the short distance transmission systems in the idle state as backup short distance transmission systems. If the states of the short distance transmission systems identified by all signs of network entry certification are busy, then the target base station transmits, according to an existing transmission mode, data to the target mobile terminal.

Step 712: The target base station splits, according to the amount of the available short distance transmission systems, the received integrated data into multiple data packages the amount of which is the same as the amount of the available short distance transmission systems, and numbers the data packages.

Step 713: The target base station sends the numbered data packages to respective available short distance transmission systems and the target mobile terminal respectively and sends a split message to the target mobile terminal.

Wherein, the split message includes a split coding mode for splitting the data packages, the number of the data packages, the size of the data packages and the serial number corresponding to each data package; and the local mobile terminal supports an MIMO transmission mode.

Step 714: Each available short distance transmission system sends the received data packages to the target mobile terminal, and sends a feedback message to the target base station.

Wherein, the feedback message includes the serial number of the data package and the size of the data package.

Step 715: The target base station determines, according to the received feedback messages, whether a failure occurs in the transmission of a data package; when a failure occurs in the transmission of a data package, Step 720 is executed. If no failure occurs in the transmission of a data package, Step 716 is executed.

Specifically, the target base station determines, according to the feedback messages received in a preset period of time (5 seconds after the target base station sends the data packages to the available short distance transmission systems), whether a failure occurs in the transmission of a data package. For example, if the target base station receives 21 pieces of feedback messages in total within 5 seconds after the target base station sends the data packages to the available short distance transmission systems, then it is determined that there is no data package transmission failure. If the target base station receives 20 pieces of feedback messages in total within 5 seconds, then it is determined that a failure occurs in the transmission of a data package.

If the number of the feedback messages received by the target base station within 5 seconds after the target base station sends data packages transmitted unsuccessfully to the available short distance transmission systems is consistent with the number of the data packages which are transmitted unsuccessfully, then it is determined that there is no data package transmission failure. If the number of the feedback messages received by the target base station is not consistent with the number of the data packages which are transmitted unsuccessfully, then it is determined that there is a data transmission failure.

Step 716: The target mobile terminal integrates the received data packages belonging to the same data, so as to recover the data. The flow is ended.

Step 171: The local mobile terminal determines, according to the received feedback messages, a serial number of a data package which is transmitted unsuccessfully.

Step 718: The local mobile terminal selects, from the backup short distance transmission systems, short distance transmission systems as available short distance transmission systems according to the number of determined serial numbers of data packages which are transmitted unsuccessfully.

For example, if the serial numbers of the data packages which are transmitted unsuccessfully are 10 and 11, then a Bluetooth transmission system and a Wi-Fi transmission system are selected from the backup short distance transmission systems as the available short distance transmission systems.

Step 719: The local mobile terminal sends, correspondingly to the available short distance transmission systems, the data packages corresponding to the serial numbers, and Step 706 is executed.

Step 720: The target base station determines the serial number of the data package which is transmitted unsuccessfully, and sends the data package corresponding to the serial number to the target mobile terminal correspondingly, and Step 716 is executed.

The above are the only preferred embodiments of the disclosure, and are not intended to limit the scope of protection of the claims of the disclosure. For example, the mobile terminal may further include a main network communication module. The main network communication module mainly includes a radio frequency transceiver module, a radio frequency amplification module, a filtering module, a matching module and a duplex module. Wherein, the modules may be independent with each other, or may be also integrated together.

The main network communication module may support one or more communication modes including GSM, Code Division Multiple Access (CDMA), Time-Division Synchronous CDMA (TD-SCDMA), Wideband CDMA (WCDMA), CDMA2000 or Long Term Evolution (LTE).

The main network communication system is connected with a main antenna. The main antenna is responsible for information communication between a mobile terminal and a base station. The main antenna may exist independently, or may be also randomly combined and integrated with antennae of respective short distance transmission systems. An integrated antenna may be a multi-polarized antenna, a multi-frequency antenna or a multi-polarized multi-frequency antenna.

The invention claimed is:

1. A method for transmitting wireless data, comprising:
when a local mobile terminal needs to send data, sending, by the local mobile terminal, to first intermediate mobile terminals adjacent to the local mobile terminal a request for inquiring states of short distance transmission systems of the first intermediate mobile terminals;
according to the amount of signs of network entry certification of the first intermediate mobile terminals fed back by the first intermediate mobile terminals, splitting, by the local mobile terminal, the data to be sent into first data packages, wherein the signs of network entry certification of the first intermediate mobile terminals indicate the short distance transmission systems of the first intermediate mobile terminals are in an idle state;
sending, by the local mobile terminal, part of the first data packages to the first intermediate mobile terminals whose short distance transmission systems are in an idle state according to the amount of the signs of network entry certification of the first intermediate mobile terminals, and sending remaining part of the first data packages to a local base station to which the local mobile terminal belongs, wherein the part of the first data packages are forwarded by the first intermediate mobile terminals to the local base station;
integrating, by the local base station, the data packages received from the local mobile terminal and the first intermediate mobile terminals belonging to the same data, and sending the integrated data to a target base station to which a target mobile terminal belongs;
receiving, by the target base station, the integrated data, and sending to second intermediate mobile terminals adjacent to the target mobile terminal a request for inquiring states of short distance transmission systems of the second intermediate mobile terminals;
according to the amount of signs of network entry certification of the second intermediate mobile terminals fed back by the second intermediate mobile terminals, splitting, by the target base station, the integrated data into second data packages, wherein the signs of network entry certification of the second intermediate mobile terminals indicate the short distance transmission systems of the second intermediate mobile terminals are in an idle state;
sending, by the target base station, part of the second data packages to the second intermediate mobile terminals whose short distance transmission systems are in an idle state according to the amount of the signs of network entry certification of the second intermediate mobile terminals, and remaining part of the second data packages to a target mobile terminal, wherein the part of the second data packages are forwarded by the second intermediate mobile terminals to the target mobile terminal; and
integrating, by the target mobile terminal, the data packages received from the target base station and the second intermediate mobile terminals belonging to the same data, so as to obtain the data from the local mobile terminal.

2. The method according to claim 1, further comprising: before the data to be sent are split into the first data packages,
determining a size of each data package according to the signs of network entry certification of the first intermediate mobile terminals,
wherein the splitting the data to be sent into first data packages comprises: splitting the data to be sent into the first data packages according to the determined size of each data package.

3. The method according to claim 2, wherein the determining a size of each data package according to the signs of network entry certification of the first intermediate mobile terminals comprises:
determining the size of each data package according to the size of the data to be sent, the amount of the signs of network entry certification of the first intermediate mobile terminals whose short distance transmission systems are in an idle state, and a transmission rate of a transmission mode applied by a short distance transmission system corresponding to a sign of network entry certification of a first intermediate mobile.

4. The method according to claim 1, further comprising: after the data to be sent are split into the first data packages, numbering the first data packages, so as to make each data package have its own serial number.

5. The method according to claim 4, further comprising: after the part of the first data packages are forwarded by the first intermediate mobile terminals to the local base station,
sending, by each first intermediate mobile terminal, a feedback message to the local mobile terminal, wherein each feedback message includes a serial number of a data package received by a first intermediate mobile terminal from the local mobile terminal;
determining, by the local mobile terminal, whether a failure occurs in the transmission of a data package according to the feedback message;
when a failure occurs in the transmission of a data package, sending, by the local mobile terminal, to the first intermediate mobile terminals adjacent to the local mobile terminal the request for inquiring the states of the short distance transmission systems of the first intermediate mobile terminals; and
sending, by the local mobile terminal, the data package to which a failure of the transmission occurs to a first intermediate mobile terminal whose short distance transmission system is in an idle state.

6. The method according to claim 4, wherein the splitting the data to be sent into first data packages according to the amount of signs of network entry certification of the first intermediate mobile terminals fed back by the first intermediate mobile terminals, comprises:
taking a part of the short distance transmission systems which are in an idle state as main short distance transmission systems according to the amount of signs of network entry certification of the first intermediate mobile terminals fed back by the first intermediate mobile terminals, and taking other part of the short distance transmission systems which are in an idle state as secondary short distance transmission systems; and
splitting, according to the amount of the main short distance transmission systems, the data to be sent into the first data packages.

7. The method according to claim 6, further comprising: after the part of the first data packages are forwarded by the first intermediate mobile terminals to the local base station,
sending, by each first intermediate mobile terminal, a feedback message to the local mobile terminal, wherein each feedback message includes a serial number of a data package received by a first intermediate mobile terminal from the local mobile terminal; and
determining, by the local mobile terminal, whether a failure occurs in the transmission of a data package according to the feedback message;
when a failure occurs in the transmission of a data package, sending, by the local mobile terminal, the data package to which a failure of the transmission occurs to a secondary short distance transmission system.

8. A mobile terminal, comprising: a first state query information sending unit, a first data package splitting unit and a first data package sending unit, wherein
the first state query information sending unit is configured to, when needing to send data, send, to first intermediate mobile terminals adjacent to the mobile terminal to which the first state query information sending unit belongs, a request for inquiring states of short distance transmission systems of the first intermediate mobile terminals;
the first data package splitting unit is configured to split, according to the amount of signs of network entry certification of the first intermediate mobile terminals fed back by the first intermediate mobile terminals, the data to be sent into first data packages, wherein the signs of network entry certification of the first intermediate mobile terminals indicate the short distance transmission systems of the first intermediate mobile terminals are in an idle state; and
the first data package sending unit is configured to send part of the first data packages to the first intermediate mobile terminals whose short distance transmission systems are in an idle state, and send remaining part of the first data packages to a local base station to which the local mobile terminal belongs, wherein the part of the first data packages are forwarded by the first intermediate mobile terminals to the local base station.

9. The mobile terminal according to claim 8, further comprising:
a data package size determination unit configured to determine a size of each data package according to the signs of network entry certification of the first intermediate mobile terminals;
wherein the first data package splitting unit is further configured to split the data to be sent into the first data packages according to the determined size of each data package.

10. The mobile terminal according to claim 9, wherein the data package size determination unit is configured to determine the size of each data package according to the size of the data to be sent, the amount of the signs of network entry certification of the first intermediate mobile terminals whose short distance transmission systems are in an idle state and a transmission rate of a transmission mode applied by a short distance transmission system corresponding to a sign of network entry certification of a first intermediate mobile.

11. The mobile terminal according to claim 8, further comprising:
a data package numbering unit configured to number the split first data packages, so as to make each data package have its own serial number.

12. The mobile terminal according to claim 11, further comprising:
a transmission failure determination unit configured to determine, according to the feedback message, whether a failure occurs in the transmission of a data package;
wherein the first state query information sending unit is further configured to, when a failure occurs in the transmission of a data package, send, to the first intermediate mobile terminals adjacent to the local mobile terminal to which the first state query information sending unit belongs, the request for inquiring the states of the short distance transmission systems of the first intermediate mobile terminals; and
wherein the first data package sending unit is further configured to send the data package to which a failure of the transmission occurs to a first intermediate mobile terminal whose short distance transmission system is in an idle state.

13. The mobile terminal according to claim 12, wherein the first data package splitting unit is further configured to: take a part of the short distance transmission systems which are in an idle state as main short distance transmission systems according to the amount of signs of network entry certification of the first intermediate mobile terminals fed back by the first intermediate mobile terminals, and take other part of the short distance transmission systems which are in an idle state as secondary short distance transmission systems; and split, according to the amount of the main short distance transmission systems, the data to be sent into the first data packages.

14. The mobile terminal according to claim 13, wherein the first data package sending unit is further configured to send the data package to which a failure of the transmission occurs to a secondary short distance transmission system.

15. A base station, comprising: a data receiving unit, a second state query information sending unit, a second data package splitting unit and a second data package sending unit, wherein the data receiving unit is configured to receive integrated data sent from another base station;

the second state query information sending unit is configured to, when needing to send the integrated data, send, to intermediate mobile terminals adjacent to a base station to which the second state query information sending unit belongs, a request for inquiring states of short distance transmission systems of the first intermediate mobile terminals;

the second data package splitting unit is configured to split, according to the amount of signs of network entry certification of the intermediate mobile terminals fed back by the intermediate mobile terminals, the integrated data to be sent into first data packages, wherein the signs of network entry certification of the intermediate mobile terminals indicate the short distance transmission systems of the intermediate mobile terminals are in an idle state; and the second data package sending unit is configured to send part of the data packages to the intermediate mobile terminals whose short distance transmission systems are in an idle state, and send remaining part of the data packages to a local base station to which the local mobile terminal belongs, wherein the part of the data packages are forwarded by the intermediate mobile terminals to the local base station.

16. A system for transmitting wireless data, comprising: a local mobile terminal, multiple relay mobile terminals, a local base station, a target base station and a target mobile terminal, wherein the local mobile terminal is configured to: when the local mobile terminal needs to send data, send to first intermediate mobile terminals adjacent to the local mobile terminal a request for inquiring states of short distance transmission systems of the first intermediate mobile terminals, and split, according to the amount of signs of network entry certification of the first intermediate mobile terminals fed back by the first intermediate mobile terminals, the data to be sent into first data packages, wherein the signs of network entry certification of the first intermediate mobile terminals indicate the short distance transmission systems of the first intermediate mobile terminals are in an idle state; and send part of the first data packages to the first intermediate mobile terminals whose short distance transmission systems are in an idle state according to the amount of the signs of network entry certification of the first intermediate mobile terminals, and send remaining part of the first data packages to a local base station to which the local mobile terminal belongs, wherein the part of the first data packages are forwarded by the first intermediate mobile terminals to the local base station;

the relay mobile terminal is configured to: feed back, according to the request for inquiring states of short distance transmission systems of the first intermediate mobile terminals send from the local mobile terminal or the target base station, the sign of network entry certification to the local mobile terminal or the target base station; and send the received data package to the local base station or the target mobile terminal;

the local base station is configured to integrate the data packages received from the local mobile terminal and the first intermediate mobile terminals belonging to the same data, and send the integrated data to the target base station to which the target mobile terminal belongs;

the target base station is configured to: receive the integrated data from the local base station, send to second intermediate mobile terminals adjacent to the target mobile terminal a request for inquiring states of short distance transmission systems of the second intermediate mobile terminals, and split, according to the amount of signs of network entry certification of the second intermediate mobile terminals fed back by the second intermediate mobile terminals, the integrated data into second data packages, wherein the signs of network entry certification of the second intermediate mobile terminals indicate the short distance transmission systems of the second intermediate mobile terminals are in an idle state; and send part of the second data packages to the second intermediate mobile terminals whose short distance transmission systems are in an idle state according to the amount of the signs of network entry certification of the second intermediate mobile terminals, and send remaining part of the second data packages to a target mobile terminal, wherein the part of the second data packages are forwarded by the second intermediate mobile terminals to the target mobile terminal; and the target mobile terminal is configured to integrate the data packages received from the target base station and the second intermediate mobile terminals belonging to the same data, so as to obtain the data sent from the local mobile terminal.

* * * * *